(No Model.)
G. D. McELWEE.
COTTON SCRAPER.
No. 600,739. Patented Mar. 15, 1898.
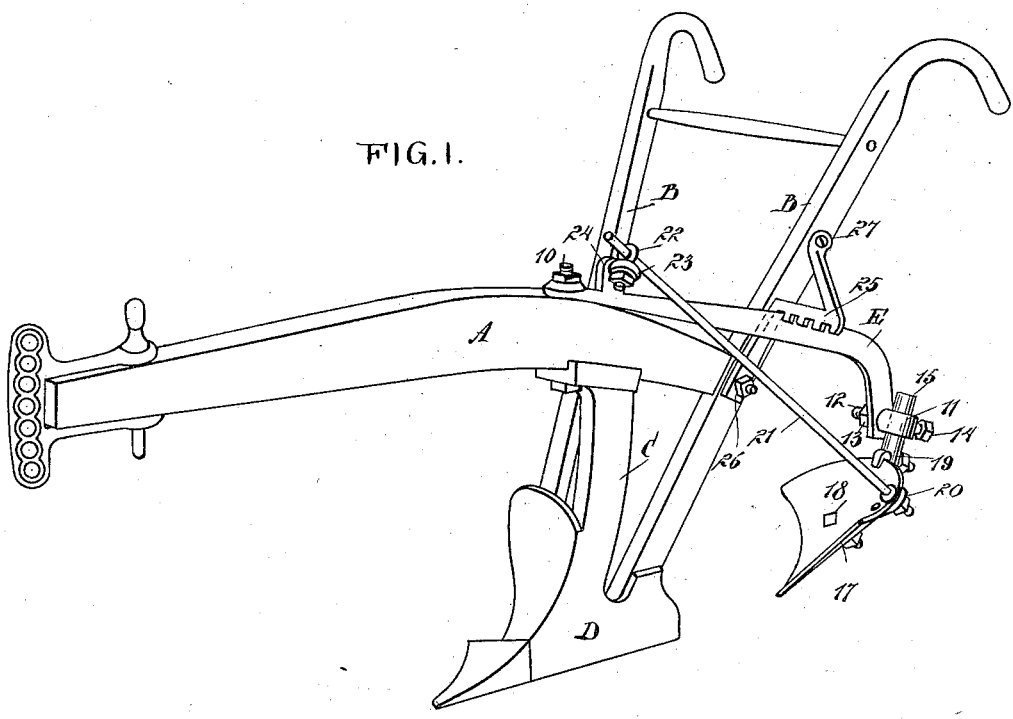
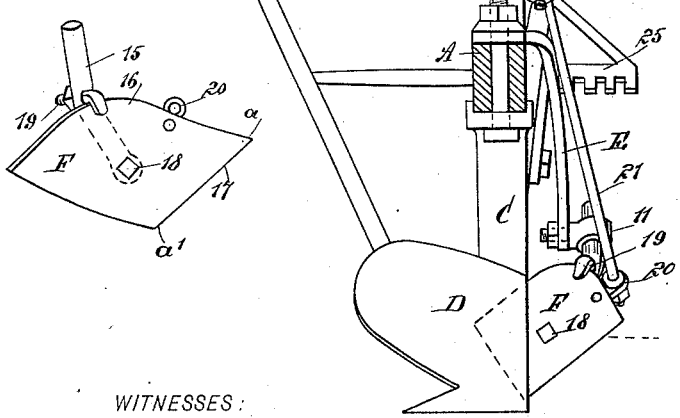
WITNESSES:
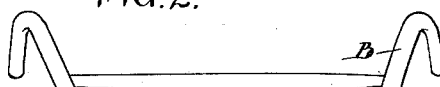
INVENTOR
G. D. McElwee
BY
ATTORNEYS.

UNITED STATES PATENT OFFICE.

GEORGE D. McELWEE, OF GLOSTER, MISSISSIPPI.

COTTON-SCRAPER.

SPECIFICATION forming part of Letters Patent No. 600,739, dated March 15, 1898.

Application filed October 12, 1897. Serial No. 654,988. (No model.)

*To all whom it may concern:*

Be it known that I, GEORGE D. McELWEE, of Gloster, in the county of Amite and State of Mississippi, have invented a new and Improved Cotton-Scraper, of which the following is a full, clear, and exact description.

The invention relates to an attachment for plows adapted for use in the cultivation of cotton-plants prior to their being thinned out. Ordinarily when cotton is cultivated at such a stage by the ordinary plowshare the cotton is left standing upon a narrow ridge the sides of which are quite perpendicular, and under such conditions when the cotton is chopped out by a hoe or like implement many of the plants fall down.

The object of my invention is to provide a share or blade auxiliary to the ordinary share, and which will follow the ordinary share in such manner as to leave the cotton-plants upon a tapering or beveled ridge, at the same time removing grass or weeds that would interfere with chopping out the surplus plants.

Another object of the invention is to provide an auxiliary share or scraper so constructed that it will automatically relieve itself from a root or stone with which it may be brought in contact.

The invention consists in the novel construction and combination of the several parts, as will be hereinafter fully set forth, and pointed out in the claim.

Reference is to be had to the accompanying drawings, forming a part of this specification, in which similar characters of reference indicate corresponding parts in all the figures.

Figure 1 is a perspective view of a plow having the improvement applied. Fig. 2 is a vertical section through the plow-beam, showing the attachment in front elevation. Fig. 3 is a perspective view of the scraper, and Fig. 4 is a side elevation of the scraper and the shank to which it is attached.

A is the beam of the plow. B is the handle, C the stock, and D the share. An iron supporting-beam E, which beam is preferably crooked or of angular construction, is attached to the plow-beam, the said supporting-beam comprising a horizontal member and a downwardly-extending vertical member at the upper end of the horizontal member. The iron supporting-beam E is secured to the plow-beam A preferably by means of the same bolt which attaches the stock C to the plow-beam, the supporting-beam being at the top of the plow-beam. Near the lower end of the vertical member of the said supporting-beam a socket 11 is located at the outer face of the supporting-beam, being provided with a threaded shank 12, which extends through the supporting-beam, and a lock-nut 13. The socket 11 is also provided with a set-screw 14.

The socket 11 is adapted to receive a shank 15, which is arranged for attachment to the scraper F. The scraper is curved or dished upon its front face and is of somewhat rectangular shape in outline, its upper right-hand corner being curved, as shown at 16 in Fig. 3. A hook-bolt 19 is carried by the shank, and the hook, with the bolt, is arranged for locking engagement with the front upper face of the scraper. The edge between the points $a$ and $a'$ is the cutting edge of the scraper, and the upper edge $a$ extends in the direction of the left-hand or land side of the plow, while the lower and opposite point $a'$ extends in the direction of the right-hand side of the plow. The scraper is located at the rear of the main share of the plow and is pivoted to the shank 10 by means of a suitable bolt 18. It is evident that the scraper may be given vertical or side adjustment by means of the shank 15, to which it is attached, or that by loosening the pivot 18 the scraper itself may be adjusted at any desired angle to the ground, yet independent of the adjustment of the shank.

At the upper left-hand end of the scraper an eye 20 is formed, which eye receives one end of a rod 21, the said rod being carried at its opposite end through the eye 22 of an eye-bolt vertically located in the eye 23 of a second eyebolt, the said second eyebolt being secured to a projection or a lug 24 from the supporting-beam E, near the supporting end of said beam.

A rack 25 is horizontally placed over the supporting-beam E, adapted to prevent the supporting bar or beam from working upward and also to admit of the said supporting-bar being secured in its lateral adjustment. The rack is in the nature of a bracket, one arm being secured to a handle of the plow where the said handle connects with the said beam, a second arm from the rack being secured to the same handle at a point above the beam.

In operation the scraper forms a second furrow narrower than the furrow made by the share D, and the furrow made by the scraper will be at an angle to the furrow made by the plowshare, and the inclination of the scraper is such as to throw the dirt away from the roots of the plants being cultivated.

It is obvious that any desired adjustment of the scraper may be made, and in the event the scraper should engage with a root, a stone, or other obstruction the socket 11 will be slightly turned to the left, allowing the nut 13 to loosen, thus drawing out the guide-rod from the eye 22. After the obstruction has been passed the parts of the scraper may be expeditiously restored to their original position.

Having thus described my invention, I claim as new and desire to secure by Letters Patent—

In a cotton-scraper, the combination with a plow having a beam, a handle, a stock, and a share, of a supporting-beam attached to the plow-beam and projecting rearwardly therefrom, the supporting-beam being adjustable on the plow-beam, a rack attached to the handle and engaging the supporting-beam to hold the same from vibration, a socket attached to the supporting-beam, a shank adjustably held by said socket, a scraper attached to and adjustable on the shank and having an eye formed therein, a rod attached to the eye and extending forwardly to the front portion of the supporting-beam, and means for securing the rod to the said front portion of the supporting-beam whereby to brace the scraper.

GEORGE D. McELWEE.

Witnesses:
F. H. WILKINSON,
J. B. CASIN, Jr.